United States Patent
McEwan (10) Patent No.: US 6,644,114 B1
(45) Date of Patent: Nov. 11, 2003

(54) DIRECT PWM REFLECTOMETER

(75) Inventor: Thomas E. McEwan, Carmel Highlands, CA (US)

(73) Assignee: McEwan Technologies, LLC, Las Vegas, NV (US)

( * ) Notice: Subject to any disclaimer, the term of this patent is extended or adjusted under 35 U.S.C. 154(b) by 0 days.

(21) Appl. No.: 09/475,407

(22) Filed: Dec. 30, 1999

(51) Int. Cl.[7] .............................................. G01F 23/00
(52) U.S. Cl. ................... 73/290 R; 73/304 R; 73/290 V
(58) Field of Search ........................... 73/290 R, 304 R, 73/290 V (56) References Cited

U.S. PATENT DOCUMENTS

| | | | |
|---|---|---|---|
| 3,695,107 A | 10/1972 | Hertz et al. ................... 73/290 |
| 3,703,829 A | 11/1972 | Dougherty ................... 73/290 |
| 3,832,900 A | 9/1974 | Ross ........................... 73/290 |
| 3,874,237 A | 4/1975 | Zwarts ........................ 73/290 |
| 4,196,385 A | 4/1980 | Vestergaard et al. ....... 324/58.5 |
| 4,287,472 A | 9/1981 | Pan et al. ..................... 324/65 |
| 4,359,902 A | 11/1982 | Lawless ....................... 73/290 |
| 4,425,793 A | 1/1984 | Turton et al. ................. 73/290 |
| 4,495,807 A | 1/1985 | Field et al. ................... 73/290 |
| 4,503,384 A | 3/1985 | Nagy et al. ................... 324/61 |
| 4,543,823 A | 10/1985 | Nagy et al. ................... 73/304 |
| 4,544,880 A | 10/1985 | Nagy et al. ................... 324/58.5 |
| 4,766,386 A * | 8/1988 | Oliver et al. ................ 324/533 |
| 4,786,857 A * | 11/1988 | Mohr et al. ............ 324/58.5 B |
| 4,864,547 A | 9/1989 | Krsna ......................... 367/137 |
| 4,866,371 A | 9/1989 | De ............................ 324/58.5 |
| 5,335,545 A | 8/1994 | Leszczynski ................. 73/602 |
| 5,400,651 A | 3/1995 | Welch ......................... 73/290 |
| 5,457,990 A | 10/1995 | Oswald et al. ................ 73/290 |
| 5,483,226 A | 1/1996 | Menut ........................ 340/621 |
| 5,554,936 A | 9/1996 | Mohr ......................... 324/642 |
| 5,565,774 A | 10/1996 | Dudding et al. ............. 324/239 |
| 5,609,059 A | 3/1997 | McEwan ..................... 73/290 |
| 5,610,611 A | 3/1997 | McEwan ...................... 342/89 |
| 5,656,774 A | 8/1997 | Nelson et al. ................. 73/290 |
| 5,717,337 A | 2/1998 | Kelly ......................... 324/534 |
| 5,723,979 A | 3/1998 | Mohr ......................... 324/642 |
| 5,726,578 A * | 3/1998 | Hook ......................... 324/643 |
| 5,784,377 A * | 7/1998 | Baydar et al. ............... 370/463 |
| 5,811,677 A | 9/1998 | Cournanc ..................... 73/304 |
| 5,819,582 A | 10/1998 | Kelly ......................... 73/290 |
| 5,838,241 A | 11/1998 | Lease et al. ................. 340/618 |
| 5,856,953 A | 1/1999 | Durkee ........................ 367/99 |
| 5,898,308 A | 4/1999 | Champion ................... 324/643 |
| 5,943,908 A | 8/1999 | Innes et al. .................... 73/290 |
| 6,137,438 A * | 10/2000 | McEwan ..................... 342/134 |
| 6,452,467 B1 * | 9/2002 | McEwan ..................... 333/240 |

* cited by examiner

*Primary Examiner*—Herzon Williams
*Assistant Examiner*—Rodney Frank
(74) *Attorney, Agent, or Firm*—Weide & Miller, Ltd.

(57) ABSTRACT

A time-domain reflectometer (TDR) forms a pulse width modulated (PWM) signal directly on a transmission line, where the PWM width is proportional to range to a discontinuity on the transmission line. Two PWM detection methods can be used: (1) realtime, wherein the PWM signal is detected in realtime; and (2) expanded-time, wherein the PWM signal is time-expanded before detection for higher accuracy. Both methods convert the analog transmission-line PWM signal to a digital output PWM signal of identical duty-cycle for averaging, counting, or other processing to indicate range. In a preferred mode, a transmission line is sampled at a floating offset frequency relative to the transmission-line PWM frequency to form a PWM output having a floating time-expansion factor but a precise duty-cycle related to the location of the discontinuity. The essence of this TDR is low cost, precision and absolute simplicity. Applications include precision tank level sensing.

31 Claims, 5 Drawing Sheets

FIG. 6

DIRECT PWM REFLECTOMETER

BACKGROUND OF THE INVENTION

1. Field of the Invention

The present invention relates to pulsed electromagnetic sensors, and more particularly to fluid and material level sensors using pulse width modulated (PWM) time-domain reflectometry (TDR). These sensors can be used for (but are not limited to) determining or controlling the material level in a tank, vat, irrigation ditch, silo, pile, or conveyor.

2. Description of Related Art

Ever since time domain reflectometry was first used in liquid level gages, as seen in U.S. Pat. No. 3,703,829, Liquid Quantity Gaging System, to Dougherty, TDR-based level sensors have grown in popularity. The TDR technique involves connecting a time-domain reflectometer to a transmission line (or probe) immersed in a liquid. The TDR measures the round-trip delay of a pulse propagating from the TDR to the liquid surface and reflecting back to the TDR. The propagation delay is independent of air temperature, pressure and humidity, and the precise location of the pulse reflection depends only on the location of liquid surface and is independent of the liquid's dielectric constant.

The probe can be a hollow coaxial structure (except for the normal center conductor) which fills with the liquid so a TDR reflection occurs at the liquid surface within. The probe can be simplified to a single-wire transmission line, as disclosed in U.S. Pat. No. 3,995,212, "Apparatus and Method for Sensing a Liquid with a Single Wire Transmission Line" to Ross.

The disadvantages to a single-wire transmission line are (1) high line impedance, making reflection-free matching to common 50-ohm interconnect cable impossible, (2) low reflection amplitude, making ringing and other aberrations more dominant, (3) sensitivity to nearby objects such as tank walls, (4) susceptibility to RF interference (no shielding), and (5) inability to form a PWM signal directly on the line, thereby requiring more complicated and less accurate pulse detectors.

Coaxial probes, while more complicated than single wire probes, have their advantages: (1) they produce strong reflection amplitudes, which is an advantage with low dielectric constant materials, (2) they exhibit stilling action, wherein sloshing is less pronounced inside the coaxial probe so steadier measurements can be obtained, and (3) they have natural shielding against the effects of nearby walls and radio frequency interference. The primary drawbacks to coaxial probes are (1) potential to become clogged, (2) greater mechanical complexity relative to a simple wire, (3) difficulty in segmenting or coiling long lengths for shipping, and (4) difficulty in cutting a long length to a custom length at the customer's location to suit specific tank dimensions. In spite of these limitations, the advantages to the coaxial probe outweigh the disadvantages in many applications, particularly where the probe length is on the order of a meter or less.

The simplicity of the TDR probe and the constancy of the speed of light (at which the TDR pulses travel), make TDR an ideal level sensing technology. Unfortunately, TDR can be expensive and of limited accuracy (0.1–1%). In order to simplify the TDR apparatus while improving its accuracy, TDR pulse processing and timing must be advanced beyond the present state.

SUMMARY OF THE INVENTION

The concept behind the present invention is (1) to set up the TDR pulses on the transmission line to directly form a PWM pulse, perhaps on a millivolt scale, (2) to detect the transmission-line PWM pulse and convert it to a logic-level PWM pulse, and (3) to process the logic-level PWM pulse by using it to gate a range counter to obtain a level indication, or by averaging it into a voltage or current proportional to level. In short, the present invention passes a transmission-line PWM pulse directly—and accurately—to the output as a digital PWM pulse without altering the PWM pulse duty cycle. This "direct-PWM" process can be implemented in a realtime mode, where the digital output PWM pulse has a realtime scale, or in an expanded-time mode, where the digital output PWM pulse has been expanded in time by a large factor to facilitate high accuracy detection and range counting.

In the realtime mode, the transmission-line PWM signal is threshold detected to form a realtime digital PWM signal having an amplitude set by the power supply voltage $V_s$, a PWM width set by the transmission-line PWM signal, and a period $T_{clk}$ set by the TDR clock. The realtime digital PWM signal can be averaged with a simple low pass filter to obtain a voltage $V_{ave}$ that is linearly proportional to the height of the liquid. $V_{ave}$ is a ratiometric voltage, $V_{ave}/V_s =$ PWM/$T_{clk}$. $V_s$ can be set to high precision, or preferably, it can be used as a reference to a ratiometric A/D converter so its amplitude does not matter. The clock period, $T_{clk}$ can be set to high accuracy with a quartz crystal oscillator. Thus, the realtime mode can be precise, in principle. In practice, propagation delay variations and other shifts in the realtime threshold detector limit accuracy. Yet, the extreme simplicity of the realtime PWM TDR apparatus is hard to ignore. It is the best mode for low cost and moderate accuracy (a few percent) tank gages or for fixed fill/overfill switches.

In the expanded-time mode, the transmission-line PWM signal is sampled to produce an expanded-time (ET) PWM signal that is a replica of the transmission-line PWM signal, except on a vastly expanded time scale. The expanded-time technique employs a stroboscopic sampling effect to convert nanosecond PWM signals to millisecond PWM signals for more accurate processing.

The expanded-time mode can be implemented in either of two ways: (1) using a single clock signal that is split into a transmit clock signal and a sampling (or receive) clock signal with a swept phase-difference between them, wherein the receive clock signal operates a sampler to produce a time-expanded PWM signal; and (2) using separate transmit and sampling (or receive) clock oscillators with a floating, i.e., unregulated, offset frequency between them to provide a steady phase slip.

The scale-factor accuracy of the two-oscillator technique is set by the accuracy of a crystal-controlled transmit clock, or ~0.003% without calibration during manufacture. With either expansion process, the sampled PWM signal is threshold-detected to produce an expanded-time digital PWM signal.

The present invention can be used as an electronic dipstick for innumerable applications in material level sensing. In combination with a valve, it can be used to control or automatically regulate the level in a tank, for example. As a linear displacement transducer, where the coaxial probe is configured as a piston and cylinder assembly, vehicle height can be sensed or pneumatic/hydraulic cylinder displacement can be measured for safety or automatic control.

DETAILED DESCRIPTION OF THE DRAWINGS

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1:
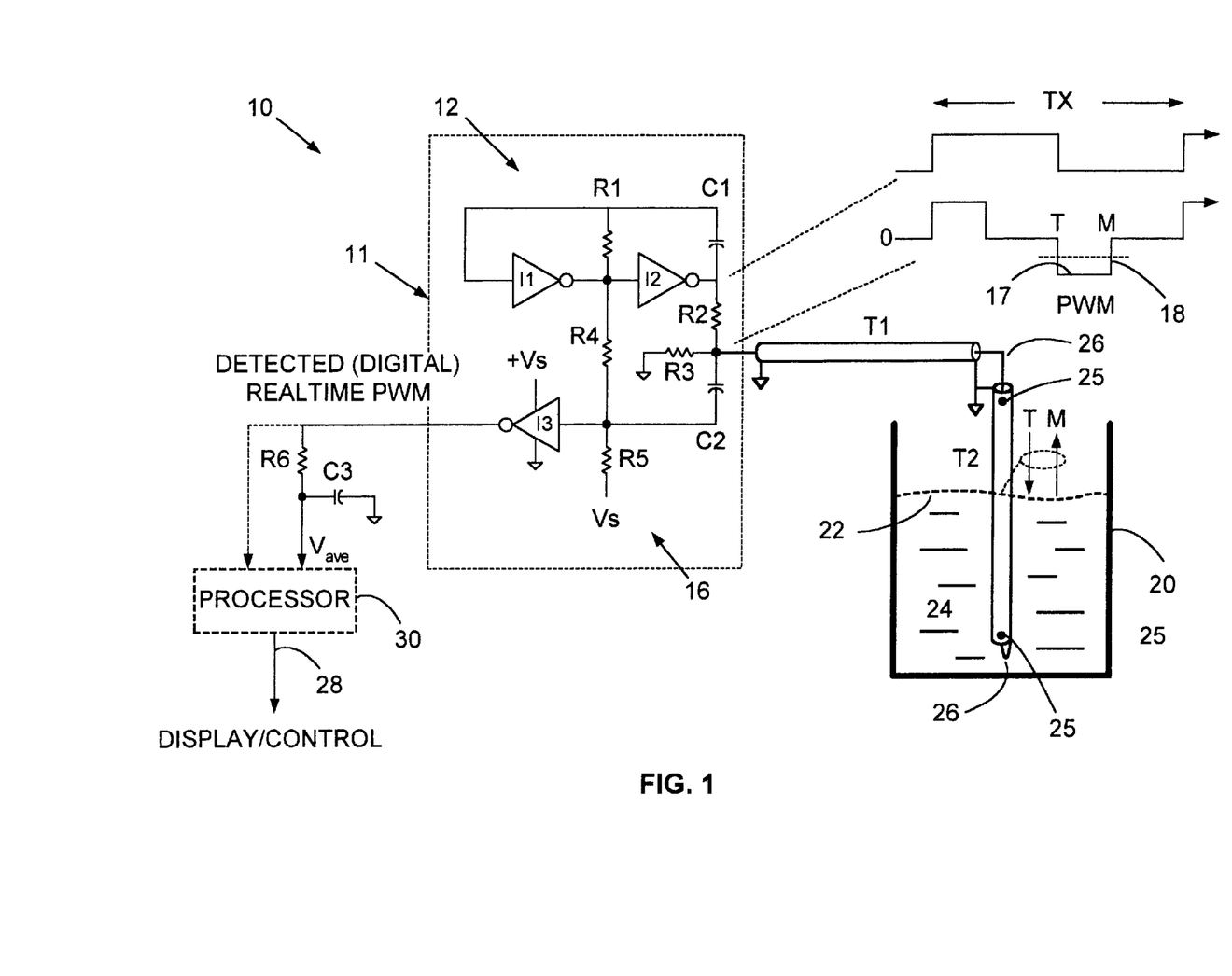
FIG. 1 is a diagram of a realtime PWM reflectometer of the present invention.

FIG. 1 is a diagram of a realtime PWM reflectometer 10 of the present invention. Transceiver 11 transmits pulses (T) down a conductor T1, preferably a coaxial cable, to a coaxial transmission line T2 that is substantially hollow except for a center conductor. T2 is inserted in a material 24 having a surface or level 22, generally in a container 20. Small openings 25 are placed at the bottom and top of T2 to allow material 24 to flow into it. More openings along T2 may be desirable and will have no deleterious effect if they are not too large. Material 24 is usually a liquid, but may also be a solid such as grain. Material 24 flows into the hollow dielectric region of T2 to level 22. The center conductor 26 of T2 is preferably shorted to its outer conductor as shown at the bottom of T2.

When propagating pulses T from transceiver 11 encounter a material 24 inside T2, some or all of the pulse energy is reflected, as reflected pulses M from surface 22, back to transceiver 11. Reflectometer 10 processes the round trip time to provide a range or fill-level indication 28 from processor 30. Transceiver 11 includes a threshold comparator 16 whose output is averaged and input, or directly input without averaging, to a processor 30.

Oscillator 12, formed of inverters I1, I2 and feedback elements R1, C1, generates a wide pulse TX which is coupled to transmission line T1 through attenuation resistor R2 and propagates a step-like transition T down T1 and T2. Transition T reflects back from surface 22 (inside T2) as an echo transition M, which has a magnitude set by a reflection coefficient Γ=−0.97 when material 24 is water and Γ=−0.33 when the material is oil or gasoline. Unlike prior art level sensors, step-like transitions are propagated and reflected rather than impulses.

Assuming Γ=−1, echo transition M propagates back to transceiver 11 at full but inverted amplitude and is terminated by network R2, R3. The summation of the M transition with voltage level 17 (present after the T transition) results in zero voltage. The parallel resistance of R2, R3 is set to match the impedance of T1, thereby terminating M without further reflections. Thus, a T-M or PWM pulse 18 is formed across R3. Both positive and negative pulses are formed from the positive and negative edges of the TX pulse, respectively, but only the negative pulse is used in this embodiment (threshold detector 16 ignores the positive pulse).

Transceiver 11 detects the T-M interval, which has a PWM width that varies with the location of surface 22. Thus T-M can be called a transmission-line PWM signal. The transmission-line PWM width is independent of apparatus delays within transceiver 11, so an accurate fill-level can be obtained with an accuracy limited, in principle, solely by the ability to detect and measure the transmission-line PWM signal.

Threshold comparator 16 is comprised of logic inverter I3, which has a sharp threshold characteristic but a poorly defined absolute threshold voltage $V_{th}$. For ideal CMOS logic, $V_{th}$ =0.5 $V_s$. $V_{th}$ may vary ~10% due to semiconductor processing, but it will closely track with other inverters on the same chip (a hex inverter such as the 74AC04 used here contains six matching inverters). The function of threshold comparator 16 is to determine when the voltage of PWM pulse 18 crosses its $V_{th}$. The problem is to accurately bias the input of I3 so PWM pulse 18 is detected at its halfway point. Thus, $V_{th}$ must be known and not assumed.

$V_{th}$ can be obtained from I1, since the negative feedback connection of R1 fixes the average value at I1's input and output at $V_{th}$. Thus, one end of R4 is connected to a node between I1 and I2 that is biased at $V_{th}$ (on average, since an oscillating signal is present). The voltage on the other end of R4, which is connected to R5 at the I3 input, is shifted up by current supplied by R5, which is connected to $V_s$. Thus, I3's effective input threshold is indicated by the dashed line on PWM pulse 18. Capacitor C2 between T1 and I3 performs an AC level shift for the transmission-line PWM pulse. C2 is large enough to maintain a steady DC voltage across its terminals.

I3 outputs digital PWM pulses having a width that matches the width of transmission-line PWM pulse 18, an amplitude of 0 to +$V_s$, and a period equal to the period of oscillator 12. When the digital PWM pulses are averaged by an (optional) analog integrator formed by R6, C3, an average voltage $V_{ave}$ is produced that is directly proportional to the transmission-line PWM pulse width, and thus the location of surface 22. The time constant of the integrator may be set to just smooth the PWM pulses or it may be set to be quite large, e.g., 30 seconds to form a slosh filter. The average voltage $V_{ave}$ from integrator R6, C3 or alternatively, the detected PWM signal from I3, is input to a processor 30 to produce a range/fill signal 28 which may be used for display or control purposes.

Processor 30 can be, but is not limited to, (1) a voltmeter driver for an analog level indication, (2) a voltage threshold comparator to indicate/control discrete fill conditions in tank 20, (3) an A/D converter to digitize tank levels at high resolution and accuracy, (4) a separate clock, gate circuit and digital clock pulse counter to directly measure the digital PWM width using techniques well known in the art, such as embodied in the Tektronix DC503 counter—the output of which can be used to digitally indicate/control the tank level. The display or control connected to the processor may be an analog meter, a digital readout, a computer, a valve to control the tank level or other process, an alarm, etc.

When processor 30 is a digital counter, the scale factor of transceiver 11 and processor 30 is set by the scale factor of the counter, which can easily be accurate to 1 ppm, independent of the frequency of oscillator 12. In contrast, when processor 30 works with averaged voltages $V_{ave}$ from R6, C3, the frequency of oscillator 12 directly affects $V_{ave}$. RC oscillator 12 has limited accuracy, perhaps 2%. For high scale-factor accuracies, the crystal oscillator 72 in FIG. 3 can be used for oscillator 12. Low cost microprocessor crystals are available with an accuracy of ~0.003%.

The primary accuracy limitation to transceiver 11 is threshold comparator 16, which must operate with a stability of 6 picoseconds for 1 mm measurement accuracy. Presently available logic inverters are not capable of this stability-about 100 ps is more likely (leading to ~1.6 cm range error). Also, due to threshold uncertainties, a large transmission-line PWM pulse (~1-volt) is needed on T1, which consumes considerable power and may pose a hazard with some materials 24. While the extreme simplicity of transceiver 11 will assure its use in some situations, many applications need a guaranteed 1%, 0.1% or even 0.01% accuracy. The expanded-time transceivers of FIGS. 2 and 3 provide high-accuracy alternatives.

Figure 2:
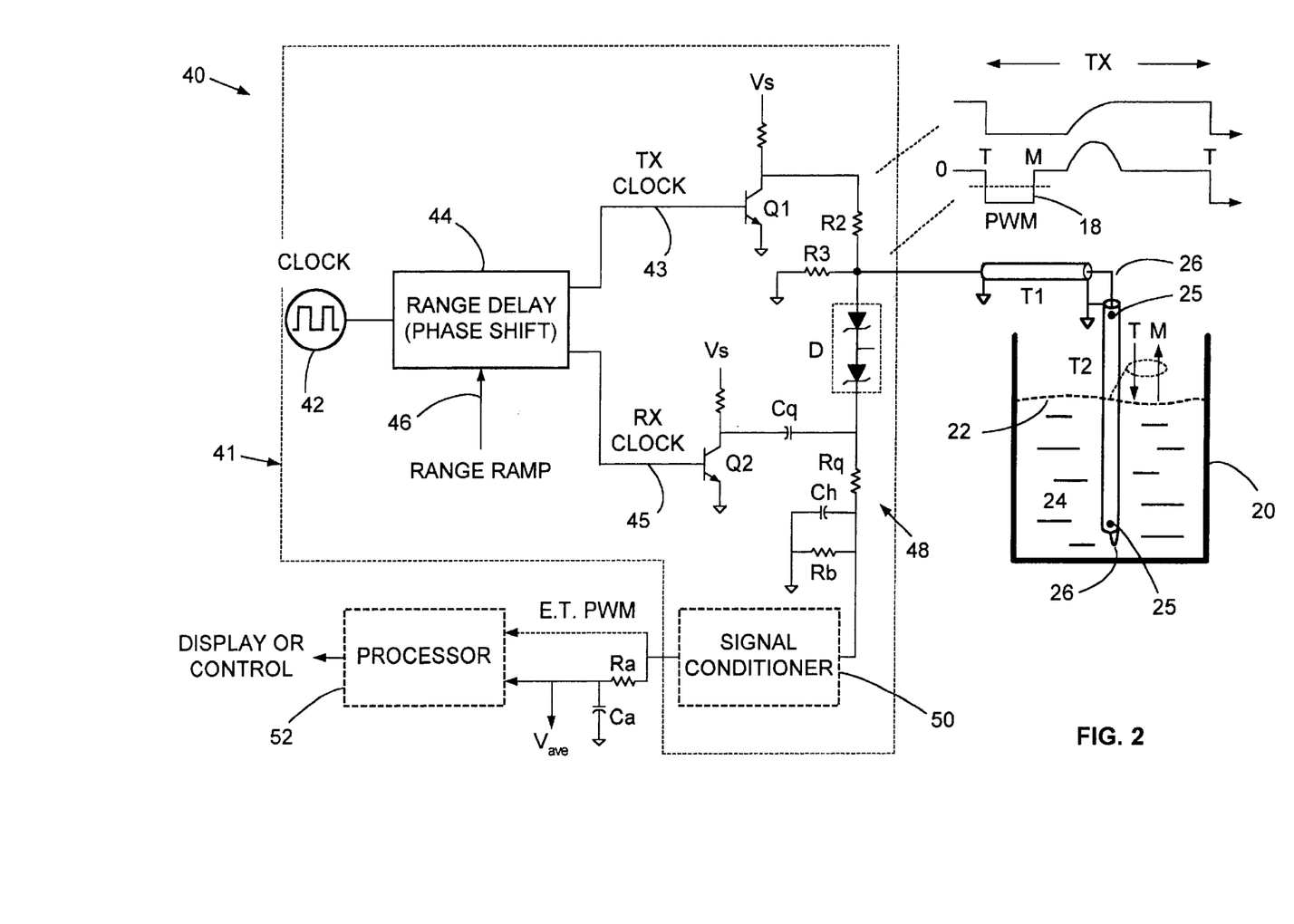
FIG. 2 is a diagram of an expanded-time PWM reflectometer of the present invention having swept-phase timing.
Figure 3:
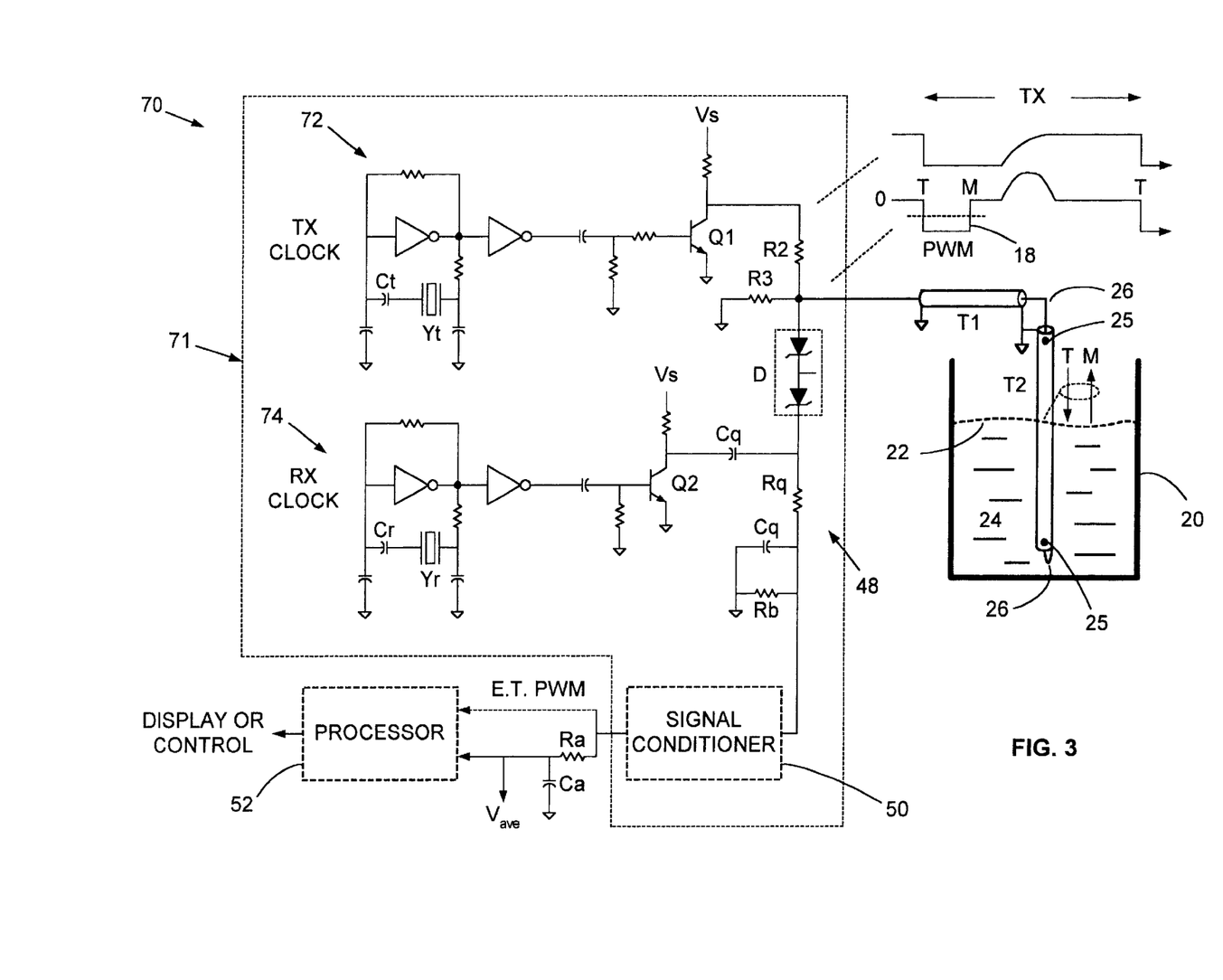
FIG. 3 is a diagram of an expanded-time PWM reflectometer of the present invention having offset clock timing.

FIG. 2 is a diagram of an expanded-time PWM reflectorheter 40 of the present invention having swept-phase timing. "Expanded-time" or "ET" is a beat-frequency effect produced by sampling PWM pulses at a slightly slower rate than the transmitted pulse rate. The net effect is very similar to shining a strobe light on a fan blade, and adjusting the strobe frequency so the blade appears to rotate very slowly. By this analogy, the rapidly rotating fan blade represents the realtime PWM pulses 18 travelling at the speed of light on T1, the strobe is an electronic gate in the receiver (or the gated sampler 48 described herein), and the slowly rotating visual effect is the expanded time millisecond-scale PWM output.

Transceiver 41 transmits pulses, and after a delay, its receiver, i.e., its sampler 48, is gated to take a sample at a particular point in time. The timing of the gate is typically swept across a range of delays (e.g., 0–100 ns) in a matter of milliseconds, such that the sampler output is a scan-like waveform which replicates events occurring on a 0–100 ns scale with an expanded-time 0–100 millisecond-scale, for example. Expanded time techniques are commonly used in wideband sampling oscilloscopes and will not be dwelt upon here.

A clock 42 provides squarewaves, typically from a 5 MHz crystal oscillator, to range delay element 44, which splits the clock signal into TX CLOCK and RX CLOCK signals on lines 43 and 45, respectively. The TX CLOCK drives pulse generator Q1 to produce a wide transmit pulse TX with a fast negative transition. The fast transition passes through attenuator resistor R2 to form transmit transition T, which propagates down Ti to dipstick probe T2. Optionally, Ti may be very short or effectively omitted as a design choice, i.e., T2 can be connected directly to R2, R3.

Reflection transitions M returning from surface 22 through T1 generally must be well-terminated to prevent unwanted triple-transit reflections or pulse "rattles". Thus, attenuation resistor R2 and termination resistor R3 must have a parallel resistance that matches the impedance of T1, typically 50 ohms.

A range ramp signal is input on line 46 to range delay element 44 to sweep the phase of the RX CLOCK signal relative to the TX CLOCK signal, either by delaying the RX CLOCK phase or advancing the TX CLOCK phase by means of voltage controlled phase shift networks. Range delay element 44 is swept across a range of delays via the range ramp input 46, which typically carries an analog voltage ramp. The analog voltage ramp usually repeats at a 25 Hz rate and sweeps the RX CLOCK signal over a 0–100 ns delay relative to the TX CLOCK signal to produce an expanded time PWM replica of the transmission-line PWM pulses 18. Range delay circuits having scale factor accuracies on the order of several tens of picoseconds or better can be realized with a Delay Locked Loop (DLL) as seen in U.S. Pat. No. 5,563,605, "Precision Digital Pulse Phase Generator" to McEwan, or in copending application Ser. No. 09/084,541, "Phase-Comparator-Less Delay Locked Loop" to McEwan.

High-speed sampler 48 is comprised of high speed sampling dual-diode D in a sampling circuit that further includes switching transistor Q2, sampling capacitor Cq, charge transfer resistor Rq, charge holding capacitor Ch, and bleeder resistor Rb. This circuit has been fully described in co-pending application Ser. No. 09/084,502, "Charge Transfer Wideband Sample-Hold Circuit" to McEwan. The advantage to a dual-diode D rather than a single diode structure is described in co-pending application Ser. No. 09/282,962, "Material Level Sensor Having a Wire-Horn Launcher" to McEwan. When the RX CLOCK biases on Q2, a fast (~100 ps) negative-going edge is driven through Cq (a small capacitor) into dual-diode D, which is biased ON for ~100 ps, thereby charging Cq to a value set in part by the PWM voltage across termination resistor R3. After D conducts, the charge on Cq transfers through Rq to Ch. Ch is typically so large that multiple conduction cycles of D spanning multiple clock cycles are required to charge Ch to a steady value, i.e., multiple repetitions are integrated on Ch to produce an average voltage for reduced noise. However, this average is a running average since the phase of the RX CLOCK signal is continually changing and the sample point is linearly increasing in time on a millisecond time scale. Bleeder resistor Rb slowly discharges Ch to allow Ch to accumulate charge during multiple clock cycles, across microseconds, but not across milliseconds, which would smear the sampled PWM waveform.

The series combination of two diodes represented by D results in one-half the terminal capacitance of a single-diode sampling circuit and thus presents less reactive loading to the TDR line and therefore a better termination for reflected pulses. For low cost embodiments, a single-diode sampler could be used with the possible introduction of spurious reflections on T1 (which may be substantially trimmed out by adding inductance in series with R3, or by other well-known matching techniques).

Signal conditioner 50 receives low-amplitude (~50 mV) expanded-time PWM replica signals from sampler 48 and threshold-detects the PWM signal at its halfway point using a comparator, or a preamp and a comparator, to provide a digital PWM output signal with a swing of 0 to $V_s$ ($V_s$=the logic power supply voltage). Ideally, the duty-cycle of the expanded-time digital PWM exactly matches the duty-cycle of the realtime transmission-line PWM. In practice, small errors in the form of range offset errors (~1 mm) can be introduced. However, the errors are far more controllable than in the realtime circuit of FIG. 1, since the detector bandwidth requirement is about $10_4$ lower with the expanded-time technique. More sophisticated PWM detectors may employ tracking threshold detectors such as a constant fraction discriminator as described in U.S. Pat. No. 5,610,611, "High Accuracy Material Level Sensor" to McEwan.

Clock 42, range delay 44, transmit pulse generator Q1, receiver or sampler 48, and signal conditioner 50 form a transceiver 41. Signal conditioner 50 produces an ET PWM output signal which may be averaged by an optional integrator Ra, Ca to produce an average voltage $V_{ave}$ that is directly proportional to the realtime PWM pulse width or the location of surface 22. Either $V_{ave}$ or the ET PWM signal is input to processor 52 to produce a display or control signal.

Processor 52 can be, but is not limited to, any of the devices described with respect to processor 30.

When processor 52 is a digital counter, the scale factor of reflectometer 40 is set by (1) the scale factor of the range delay, which can be accurate to 0.01%, and (2) the accuracy of the digital counter formed by processor 52, which can easily be accurate to 1 ppm. When processor 52 works with averaged voltages $V_{ave}$ from Ra, Ca, the peak voltage of the expanded-time digital PWM signal (which=Vs) directly affects the accuracy of $V_{ave}$. For best accuracy, a voltmeter readout, a comparator, A/D converter, or other analog device should be configured to scale ratiometrically with the peak voltage of the digital PWM signal, i.e., with the CMOS supply voltage that provides the digital PWM pulse.

FIG. 3 is a diagram of an expanded-time PWM reflectometer 70 of the present invention having offset clock timing. The operation of Q1, Q2, sampler 48, signal conditioner 50, transmission lines T1, T2, and processor 52 is similar to the description in reference to FIG. 2.

The TX CLOCK 72 is typically a first crystal oscillator which operates at 10 MHz+Δ/2, with Δ/2 having a range of +15 to +75 ppm of the TX CLOCK frequency. The TX CLOCK drives pulse generator Q1 to produce a wide transmit pulse TX with a fast negative transition. The fast transition passes through attenuator resistor R2 to form transmit transition T, which propagates down T1 to dipstick probe T2. Optionally, T1 may be very short or effectively omitted as a design choice.

The RX CLOCK 74 is typically a second crystal oscillator set to 10 MHz−Δ/2. Thus, the RX CLOCK smoothly slips 360° in phase Δ times per second relative to the TX CLOCK and thus produces a slow, linear time scan of the realtime pulses present across R3, i.e., the input to sampler 48. Offset frequency Δ is not regulated for reasons of cost and simplicity. Offsets +Δ/2 for the TX CLOCK and −Δ/2 for the RX CLOCK are conveniently obtained by purchasing 10 MHz+/−30 ppm crystals and using fixed trim capacitors Ct, Cr in their respective oscillator circuits to define the offsets. Alternatively, low accuracy crystals Yt, Yr may be used with a variable trim capacitor for at least one of Ct or Cr to trim Δ. In either case, capacitors Ct and Cr offset the TX and RX 10 MHz oscillators a nominal +45 and−45 ppm respectively, to produce a nominal Δ=900 Hz. Since the crystals have matching characteristics, Δ tracks to 900+/−100 Hz over −55 to +65° C. Crystals Yt, Yr are commercially available (e.g., microprocessor crystals) at low cost with +/−30 ppm accuracy, such as the Epson type CA-301.

TX CLOCK 72, RX CLOCK 74, transmit pulse generator Q1, gate pulse generator Q2, and receiver or sampler 48 form a transceiver 71. The ET PWM signal is processed similarly to the signal in FIG. 2.

Processor 52 in FIG. 3 performs similar functions as described with reference to processor 52 in FIG. 2. However, when processor 52 is a digital counter, both the expanded-time PWM width $W_{ET}$ and period $P_{ET}$ must be measured by the counter, and the width to period ratio must be computed to obtain duty cycle DC. After accounting for two-way travel, range R output from processor 52 is R=0.5 $P_{RT}$ DC, where $P_{RT}$ is the TX CLOCK period (or 1/TX frequency), and DC=($W_{ET}$)/($P_{ET}$)=equivalent time duty cycle. Processor 52 must be responsive to duty cycle DC since both $P_{ET}$ and $W_{ET}$ scale with 1/Δ, and Δ is not regulated. Experiments show Δ varies ~10% over common outdoor temperatures. However, $P_{RT}$ and DC are independent of Δ, so range reading R is very accurate and independent of temperature.

Processor 52 may process an averaged voltage, $V_{ave}$=DC*$V_s$, obtained from averaging the ET PWM pulse with network Ra, Ca. Since the peak voltage of the expanded-time digital PWM signal scales with $V_s$, a voltmeter readout, a comparator, A/D converter, or other analog device should be configured to scale ratiometrically with $V_s$.

Figure 4:
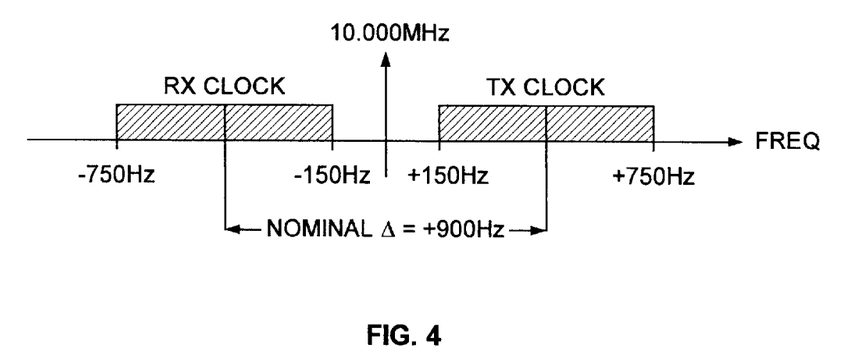
FIG. 4 indicates the TX and RX clock frequency tolerances for the reflectometer of FIG. 3.

FIG. 4 shows the expected frequency ranges for 10 MHz TX and RX oscillators with +/−300 Hz tolerance. The TX and RX frequencies are offset with trim capacitors Ct and Cr to provide Δ/2=+450 and −450 Hz respectively. The maximum spread due to crystal tolerances is Δ=+/−150 to +/−750 Hz. It is desirable to limit the range of Δ to 300–1500 Hz to relax requirements on signal conditioner 50. A narrower spread in Δ can be obtained by trimming Ct or Cr, or by purchasing higher tolerance crystals.

In another clock architecture, the RX CLOCK may operate with a crystal oscillating at a harmonic of the TX CLOCK plus a small offset Δ, and when combined with a pulse selector circuit, a limited-range sweep can be obtained, such as from 0 to 36°. This is described in co-pending application Ser. No. 09/285,220, "Precision Radar Timebase Using Harmonically Related Offset Oscillators" to McEwan. Also, offset frequency Δ can be regulated to provide a fixed rather than floating output PWM period using a phase-locked-Loop (PLL) controller to regulate the TX and RX CLOCK frequencies, as described in co-pending application Ser. No. 09/282,947, "Self locking Dual Frequency Clock System" to McEwan.

Figure 5:
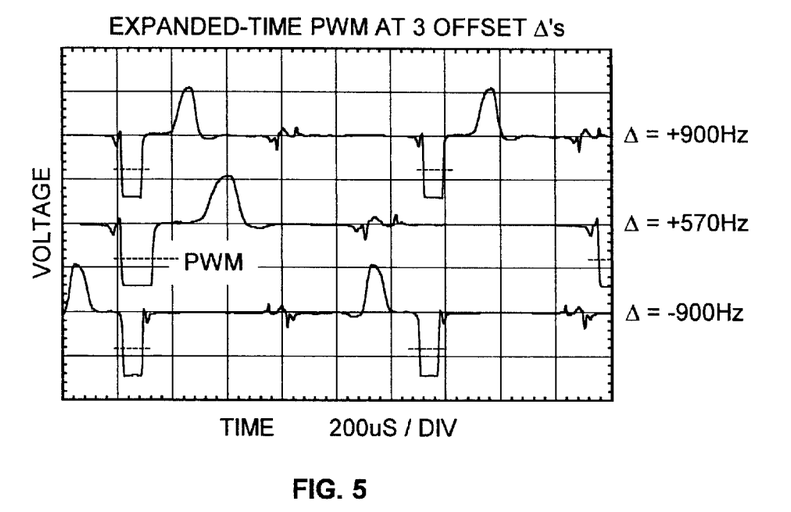
FIG. 5 plots the expanded-time PWM waveforms for three different values of offset frequency Δ for the reflectometer of FIG. 3.

FIG. 5 plots the expanded-time PWM waveforms for three different values of offset frequency Δ for the reflectometer of FIG. 3. The upper trace is the result of a nominal offset frequency Δ=900 Hz, the middle trace occurs with Δ=570 Hz, and most interestingly, the lower trace is with Δ=−900 Hz, showing a time-reversed waveform. The illusion of time reversal occurs in the same way a strobe light can illuminate a fan blade to make it look like it is moving backwards. Most noteworthy, the PWM duty cycle, i.e., the PWM width to repetition period, remains constant regardless of Δ. Since the transmission-line PWM pulse rate is within 0.003% of 10 MHz, it repeats with a period of 100 ns within 0.003%. Thus the period seen in any of the three traces in FIG. 5 always represents 100 ns +/−0.003%. By inspection of FIG. 5, the PWM duty cycle is ~7.4%, so its realtime width is 0.074(100 ns)=7.4 ns. After factoring in the speed of light and two-way travel, 7.4 ns corresponds to a range of 1.11 meters from transceiver 71 to reflecting surface 22.

Figure 6:
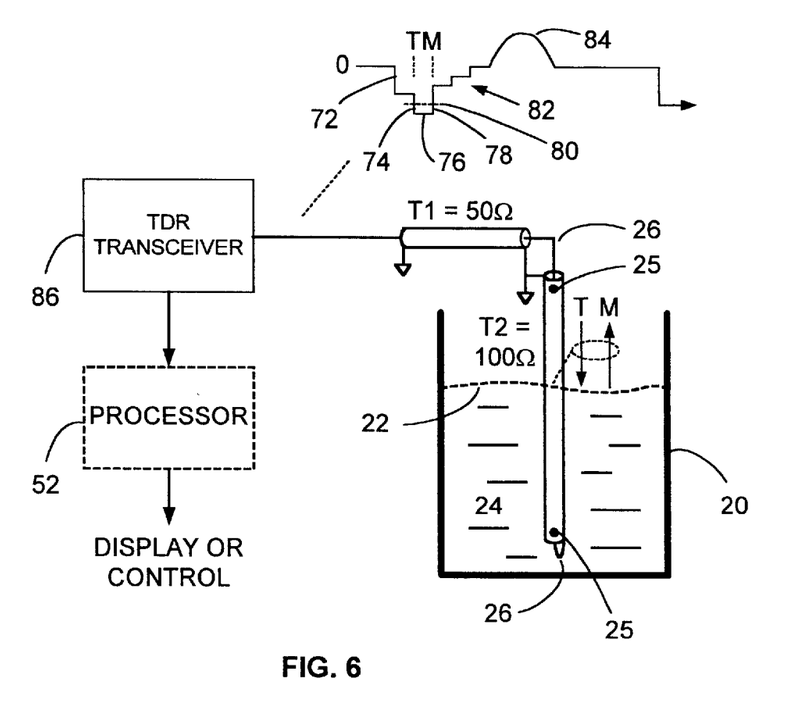
FIG. 6 shows a method to eliminate the propagation delay of T1 from the digital PWM pulse width.

FIG. 6 shows a method to eliminate the propagation delay of T1 from the detected PWM pulse width. Transceiver 86 includes transceivers 11, 41, and 71 as described with reference to FIGS. 1, 2 and 3 respectively. The impedance of T1=50 Ω (or the impedance of TDR transceiver 86). The impedance of probe T2=100 Ω (or any higher impedance than the impedance of T1). Transceiver 86 outputs a negative-going transition 72 which propagates down T1 and reflects off T2, producing a second transition 74 (labeled T) which adds to the first transition 72. The first transition continues to forward propagate from T1 down T2 until it reflects (inverted), either partially or wholly, from surface 22 and propagates back to the transceiver to produce a third transition 78 (labeled M). Other reflections 82, or "rattles", continue but are ignored by transceiver 86. Transceiver 86 detects the T-M transitions with a threshold 80 set at half the maximum transition amplitude of transitions 74 and 78 to form a detected PWM pulse having a width corresponding to the round-trip propagation delay of T2 to surface 22. Thus, the round-trip delay of T1 (transition 72 to transition 74) is not included. The length or dielectric constant of T1 does not need to be known to obtain an accurate level gage using T2. Threshold 80 can be set by peak-detecting level 76 and establishing a detection threshold as a fraction of the peak-detected level (constant fraction discriminator). Another detection method involves clamping voltage 76 to a reference voltage and establishing a threshold relative to the clamp reference voltage.

Although the invention has been described with reference to a coaxial probe (or dipstick), the principles of direct-PWM, floating offset oscillators, sampling, and realtime to expanded-time PWM techniques also apply to/other TDR probes such as a 1-wire Goubau line and a 2-wire dipstick, as well as appropriately-interfaced radar and laser systems.

Changes and modifications in the specifically described embodiments can be carried out without departing from the scope of the invention which is intended to be limited only by the scope of the appended claims.

What is claimed is:

1. A method of detecting the level of a material comprising:
   producing transmit pulses at a transmit clock frequency;
   transmitting the transmit pulses into a transmission line which extends into the material;
   producing realtime transmission line pulse width modulated (PWM) pulses by combining transmitted pulses with reflected pulses from the material;
   detecting the realtime PWM pulses;
   converting the realtime transmission line PWM pulses to digital PWM pulses;
   obtaining material level from the digital PWM pulses.

2. The method of claim 1 wherein the realtime transmission line PWM pulses are converted to digital PWM pulses in realtime.

3. The method of claim 2 wherein the realtime transmission line PWM pulses are converted to digital PWM pulses by threshold detecting the realtime transmission line PWM pulses.

4. The method of claim 1 wherein the realtime transmission line PWM pulses are converted to digital PWM pulses in expanded time.

5. The method of claim 4 wherein the realtime transmission line PWM pulses are converted to digital PWM pulses by sampling the realtime transmission line PWM pulses to produce an expanded time PWM signal that is a replica of the transmission line PWM signal on an expanded time scale.

6. The method of claim 5 wherein the sampling is performed with a sampling clock signal which is obtained by splitting a single clock signal into a transmit clock signal and a sampling clock signal with a swept phase difference with respect to the transmit clock signal.

7. The method of claim 5 wherein the sampling is performed with a sampling clock signal from a sampling clock oscillator which is separate from a transmit clock oscillator, wherein the transmit and sampling clock oscillators have a floating offset frequency between them to provide a steady phase slip.

8. A time domain reflectometer (TDR), comprising:
   a transmit pulse generator for producing transmit pulses at a transmit clock frequency;
   a conductor connected to the transmit pulse generator;
   a transmission line connected to the conductor for conducting transmit pulses to and reflecting pulses from a discontinuity along the transmission line produced by extending the transmission line into a material;
   a termination connected to the conductor to terminate reflected signals from the transmission line and to form a realtime pulse width modulated (PWM) signal;
   a detector and converter connected to the termination to detect the realtime PWM signal and convert the realtime PWM signal to a digital PWM signal;
   a signal processor to obtain material level from the digital PWM signal.

9. The TDR of claim 8 wherein the detector and converter comprises a threshold detector which forms a realtime digital PWM signal.

10. The TDR of claim 8 wherein the detector and converter comprises a sampler which samples the realtime PWM signal at the termination and forms an expanded time digital PWM signal.

11. The TDR of claim 10 further comprising a gating pulse generator connected to the sampler.

12. The TDR of claim 11 wherein the gating pulse generator is a swept phase timing system which produces gating pulses from the transmit pulses.

13. The TDR of claim 11 wherein the gating pulse generator is an offset clock timing system having a sampling clock oscillator separate from a transmit clock oscillator with a floating offset frequency between the two oscillators.

14. The TDR of claim 8 further comprising a low pass filter between the detector and converter and the signal processor to average the digital PWM signal.

15. The TDR of claim 8 wherein the transmission line is a hollow coaxial transmission line.

16. A method of detecting the level of a material, comprising:
   producing transmit pulses at a clock frequency;
   transmitting the transmit pulses into a transmission line which extends into the material;
   combining the transmitted pulses with echo pulses from the transmission line to form a realtime PWM signal;
   threshold detecting the realtime PWM signal;
   processing the detected realtime PWM signal to indicate material level.

17. The method of claim 16 wherein the transmission line is a hollow coaxial transmission.

18. The method of claim 16 further comprising averaging the detected realtime PWM pulses to obtain an average voltage proportional to the realtime PWM pulse width to indicate range or material level.

19. A method of detecting the level of a material, comprising:
   producing transmit pulses at a clock frequency;
   transmitting the transmit pulses into a transmission line which extends into the material;
   combining the transmitted pulses with echo pulses from the transmission line to form a realtime PWM signal;
   producing receive clock pulses with swept phase relative to the transmit clock pulses;
   sampling the realtime PWM signal with timing from the receive clock pulses to produce an expanded-time PWM signal;
   processing the detected realtime PWM signal to indicate material level.

20. The method of claim 19 wherein the transmission line is a hollow coaxial transmission line.

21. The method of claim 19 wherein producing the receive clock pulses comprises operating a receive clock with a delay-locked-loop having a voltage-controlled swept phase.

22. The method of claim 19 further comprising averaging the expanded-time PWM pulses to obtain an average voltage proportional to the realtime PWM pulse width to indicate range or material level.

23. A method of detecting the level of a material, comprising:

operating a transmit clock at a transmit clock frequency;

producing, at the transmit clock frequency, transmit pulses;

transmitting the transmit pulses into a transmission line which extends into the material;

combining the transmitted pulses with echo pulses from the transmission line to form a realtime PWM signal;

operating a receive clock at a receive clock frequency that is offset from the transmit clock frequency by a floating frequency $\Delta$;

sampling the realtime PWM signal with timing from the receive clock to produce an expanded-time PWM signal having a floating repetition period $1/\Delta$;

processing the detected realtime PWM signal to indicate material level substantially independent of $\Delta$.

24. The method of claim 23 wherein the transmission line is a hollow coaxial transmission line.

25. The method of claim 23 wherein operating the receive clock comprises setting the receive clock frequency to a floating offset frequency $\Delta$ with fixed transmit and receive clock trim capacitors.

26. The method of claim 23 further comprising averaging the expanded-time PWM pulses to obtain an average voltage proportional to the realtime PWM pulse width to indicate range or material level.

27. The method of claim 23 wherein processing the expanded-time PWM signal comprises measuring both the expanded-time PWM width and period, and computing the ratio, or equivalently the duty cycle, to indicate range or material level.

28. A time domain reflectometer (TDR), comprising:

a transmit-pulse generator for producing transmit pulses, a conductor connected to the transmit pulse generator, a transmission line connected to the conductor for conducting transmit pulses to and reflecting pulses from a discontinuity along the transmission line at a range to be determined produced by extending the transmission line into a material, a termination connected to the conductor to terminate reflected transmit pulses received from the transmission line and to form a realtime PWM signal, a threshold detector connected to the termination for detecting the realtime PWM signal to produce a detected realtime PWM signal;

a signal processor to obtain material level from the detected realtime PWM signal.

29. The TDR of claim 28 further comprising an integrator to smooth the detected realtime PWM signal into a steady voltage proportional to the range to the discontinuity.

30. A time domain reflectometer (TDR), comprising:

a transmit pulse generator for producing transmit pulses at a transmit clock frequency, a conductor connected to the transmit pulse generator, a transmission line connected to the conductor for conducting transmit pulses to and reflecting transmit pulses from discontinuities along the transmission line at a range to be determined produced by extending the transmission line into a material, a termination connected to the conductor to terminate reflected transmit pulses received from the transmission line and to form a realtime PWM signal, a sampler connected to generate an expanded-time PWM signal, a gating pulse generator connected to the sampler and operating with swept phase relative to the transmit pulses, a signal conditioner connected to the sampler for at least one of amplifying or threshold detecting the expanded-time PWM signal;

a signal processor to obtain material level from the signal conditioned expanded-time PWM signal.

31. A time domain reflectometer (TDR), comprising:

a transmit pulse generator for producing transmit pulses at a first frequency, a conductor connected to the transmit pulse generator, a transmission line connected to the conductor for conducting transmit pulses to and reflecting transmit pulses from discontinuities along the transmission line at a range to be determined produced by extending the transmission line into a material, a termination connected to the conductor to terminate reflected transmit pulses received from the transmission line and to form a realtime PWM signal, a sampler connected to generate an expanded-time PWM signal, a gating pulse generator connected to the sampler and operating at a second frequency that is offset from the first frequency by a floating offset frequency $\Delta$, a signal conditioner connected to the sampler for at least one of amplifying or threshold detecting the expanded-time PWM signal;

a signal processor to obtain material level from the signal conditioned expanded-time PWM signal.

* * * * *